United States Patent [19]

Hals

[11] Patent Number: 5,678,457
[45] Date of Patent: Oct. 21, 1997

[54] ADJUSTABLE BICYCLE HANDLEBAR STEM WITH A BUILT-IN SHOCK ABSORBER

[75] Inventor: Cato Hals, Oslo, Norway

[73] Assignee: Hals Biomechanics AS, Oslo, Norway

[21] Appl. No.: 500,894

[22] PCT Filed: Feb. 1, 1994

[86] PCT No.: PCT/NO94/00029

§ 371 Date: Sep. 29, 1995

§ 102(e) Date: Sep. 29, 1995

[87] PCT Pub. No.: WO94/18057

PCT Pub. Date: Aug. 18, 1994

[30] Foreign Application Priority Data

Feb. 1, 1993 [NO] Norway ............... 93 0350

[51] Int. Cl.[6] .............. B62K 21/08; B62K 21/22
[52] U.S. Cl. .............. 74/551.3; 74/551.2
[58] Field of Search .............. 74/551.1, 551.2, 74/551.3, 551.6, 551.7; 280/279

[56] References Cited

U.S. PATENT DOCUMENTS

| | | | |
|---|---|---|---|
| 5,186,074 | 2/1993 | Arnold | 74/551.1 X |
| 5,220,851 | 6/1993 | Flechel | 74/551.6 X |
| 5,241,881 | 9/1993 | Chen | 74/551.2 |
| 5,327,798 | 7/1994 | Lerch, Jr. | 74/551.1 X |

FOREIGN PATENT DOCUMENTS

| | | |
|---|---|---|
| 867249 | 10/1941 | France. |
| 666499 | 9/1938 | Germany. |
| 90/03302 | 4/1990 | WIPO. |
| 92/13749 | 8/1992 | WIPO. |

*Primary Examiner*—Charles A. Marmor
*Assistant Examiner*—Mary Ann Battista
*Attorney, Agent, or Firm*—Wenderoth, Lind & Ponack

[57] ABSTRACT

A handlebar stem for a bicycle includes a post to be clamped to a bicycle tube frame, upper and lower profile arms journalled to a top part of the post, and a forward handlebar clamp journalled to the upper and lower profile arms, the handlebar clamp and the upper and lower profile arms being movable to different angular positions relative to the post. A shock absorber acts to cushion forces acting on the handlebar clamp in at least some of the different angular positions. The shock absorber includes an outer pipe, an inner pipe telescopically movable in the outer pipe, and a first spring having a spring force acting between the inner and outer pipes. A locking device is operable to lock the handlebar clamp and the upper and lower profile arms in a plurality of arrested different angular positions. The locking device includes a plurality of holes formed in the inner pipe, a piston having a stud, and a second spring urging the piston toward the inner pipe to cause the stud to enter a selected one of the holes.

20 Claims, 3 Drawing Sheets

ADJUSTABLE BICYCLE HANDLEBAR STEM WITH A BUILT-IN SHOCK ABSORBER

BACKGROUND AND SUMMARY OF THE INVENTION

The present invention relates to a handlebar stem for a bicycle or similar vehicle, i.e. the connecting member which provides fastening to the bicycle frame and which clamps the handlebars themselves. Particularly the invention concerns a handlebar stem which is adjustable, and even more particularly an adjustable handlebar stem with a built-in option for cushioning or shock absorbing.

Modern bicycles, particularly bicycles of the "mountain bike" type, "offroad bike", "terrain bike", are often equipped with cushioning or shock absorbing structures. For example, cushioning front forks of the telescopic type can be found on the marked, and springy rear forks and seat stems are also used.

The present invention concerns shock absorbers especially for the hands, arms and back of a bicyclist by equipping the bicycle handlebar stem with a cushioning system.

BRIEF DESCRIPTION OF THE DRAWINGS

A more detailed description of the invention now will be made, with reference to the accompanying drawings, wherein.

DETAILED DESCRIPTION OF THE INVENTION

Figure 1:
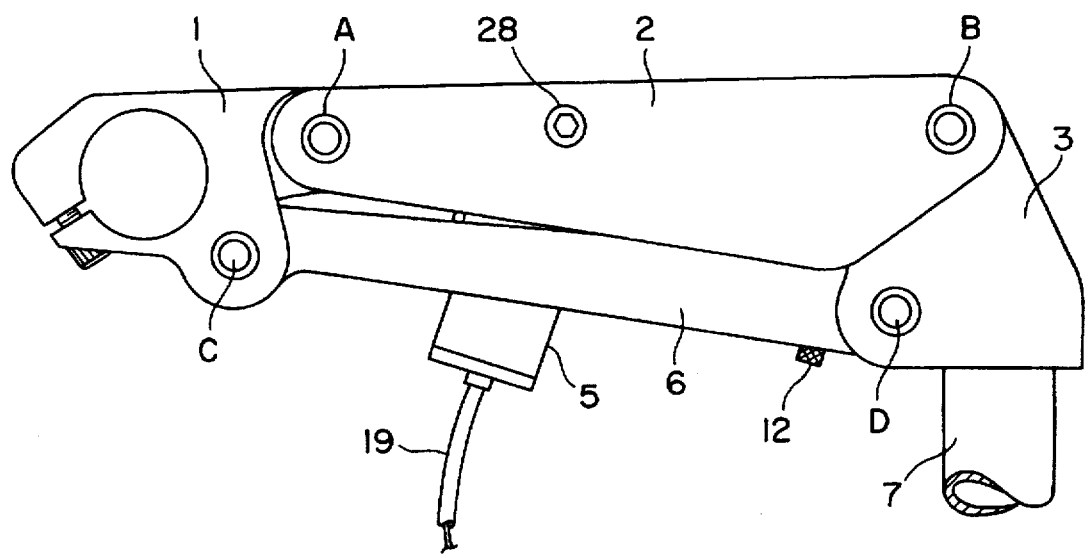
FIG. 1 is a side view of an example of a handlebar stem in accordance with the invention.

An important feature of the handlebar stem shown in FIG. 1 is that its angular position is adjustable by means of a (not shown) lever provided on the bicycle handlebars (not shown). The handlebars are clamped in forward handlebar clamp 1, and can be displaced by moving members 1, 2, and 6 about bearings B and D on top part 3 of stem post 7, which is fixed in a conventional manner down in a (not shown) forward tube of a bicycle frame. Members 2 and 6 are designated as respectively upper and lower profile arms. It should be noted that the lower profile arm 6 has a longitudinal opening in its underside, which opening is not shown in the drawing.

It is possible to use a parallelogram-type bearing configuration as well as a non-parallelogram-type configuration for members 1, 2, 3 and 6. Using a parallelogram handlebar guidance, i.e. with distance AC equal to distance BD and also will AC parallel to BD, it is achieved that the angular position of the handlebars themselves will remain unchanged when the handlebar stem angle is changed, while the angular position of the handlebars will be rotated somewhat when the stem is lowered/hoisted in a non-parallelogram embodiment. It is not important for the present invention which type is selected.

The lever on the handlebars influences the handlebar stem via cable 19, which cable ends in a pipe socket 5 adapted for locking the handlebar stem angular position in one particular of a number of fixed positions, that is, positions that are fixed while disregarding the cushioning/shock absorbing function. The operation of the locking pipe socket 5 as well as the operation of toothed nut 12 which protrudes somewhat appear more clearly in FIG. 2, to which reference now will be made.

Figure 2:
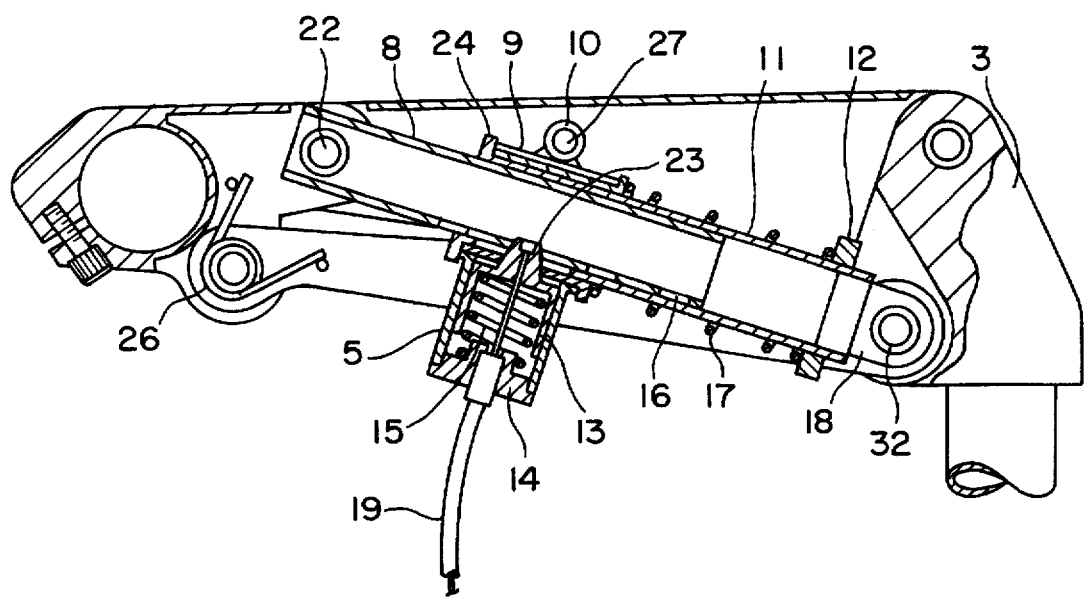
FIG. 2 is a sectional view thereof.

In FIG. 2, inner parts of the present embodiment of the handlebar stem appear more clearly. An adjustment device which mainly extends between bearings A and D, comprises details (most of which are shown separately in FIG. 3) which provide both locking and cushioning operation. An inner pipe 8 (which actually can be rather massively constructed, i.e. the pipe may be replaced by a substantially massive cylinder) is fastened to the upper forward axis A by means of a mounting hole 22, and in a rearward direction it is positioned telescopically inside an outer pipe 11 which has its rear end fastened to the lower rearward bearing D.

Outside the forward end of the outer pipe 11, there is a specially designed sleeve 9, which is constructed integrally with the above mentioned locking pipe socket 5. This part is designated as an integrated T-shaped member 25 (see FIG. 3), and thus it consists essentially of two relatively short pipes 5 and 9 welded together in a T-shape. Sleeve 9 can slide along the outer pipe 11 so far as to engage a forward flange 24 on outer pipe 11 (see FIG. 3). Sleeve 9 is pushed forward toward flange 24 by a powerful spring means, which in the illustrated embodiment is a coil spring 17 placed around the outer pipe 11 and having a rear end engages the above mentioned toothed nut 12, which nut can be screwed back and forth on a threaded section of the outer pipe 11 in order to adjust the spring force (prestressing). A tool which engages the nut 12 may be used in this connection.

On the underside of inner pipe 8 there is provided a series of conically shaped holes 16. Inside the locking pipe socket 5 there is a piston 13 with a conically shaped stud 23 which is adapted to enter the holes 16. By means of a prestressing spring 15 the conical stud 23 of piston 13 is normally held with upward tension inside one of the hole 15, and the angular position of the handlebar stem in relation to, e.g., post 7 (actually the angular position of one of the profile arms, e.g. the upper profile arm, in relation to post 7) is then held in a locked position. The inner pipe 8 is then fixed to piston 13, which further provides a secure connection to the T-shaped member 25, which is held fixedly outside the outer pipe 11 between flange 24 and the strong spring 17.

It must be noted that outer pipe 11 also has an opening 21 on the underside thereof (see FIG. 3), i.e. an elongate and longitudinal opening aligned with the holes 16 in the inner pipe 8, in such a manner that the conical stud 23 on the piston 13 passes through opening 21 to enter a hole 16.

If now a large force (from a shock) pushes in a downward direction at the front edge, i.e. on the handlebars, a force is transmitted via the inner pipe 8, piston 13 and T-shaped member 25 to the strong spring 17 which is compressed by the sleeve 9 which will travel somewhat down the outer pipe 11 together with the inner pipe 8 which slides telescopically. Simultaneously, the profile arms 2, 6 and the handlebar clamp 1 will swing down. The travel possibility is provided by the slit or opening 21 in the underside of outer pipe 11. The powerful spring 17 thereafter provides a return spring action back to the locked annular position.

In order to change from one locked angular position to another, the above mentioned lever on the handlebars is operated so that the wire in cable 19 pulls piston 13 with its conically shaped stud 23 back, i.e. downward and out of hole 16. Then the inner pipe 8 is "free" to slide telescopically in the outer pipe 11, i.e. without meeting any resistance from the powerful spring 17. By lifting or lowering the handlebars manually, the inner pipe 8 can be displaced until another hole 16 corresponds with the conical stud 23, which thereafter can be let loose by lever operation to move upward, locking the stem in a new angular position.

In order that the movement from one locking position to another shall be perceived properly by the bicyclist, i.e. not completely slack, a tensioning spring 26 is provided in order to force two of the movable main members apart. In the present embodiment the tensioning spring 26 is shown positioned in the lower forward bearing C. This tensioning spring forces the lower profile arm 6 and the handlebar clamp 1 apart, and provides a slight resistance against downward movement of the handlebar stem as well as assistance to an upward movement.

Figure 3:
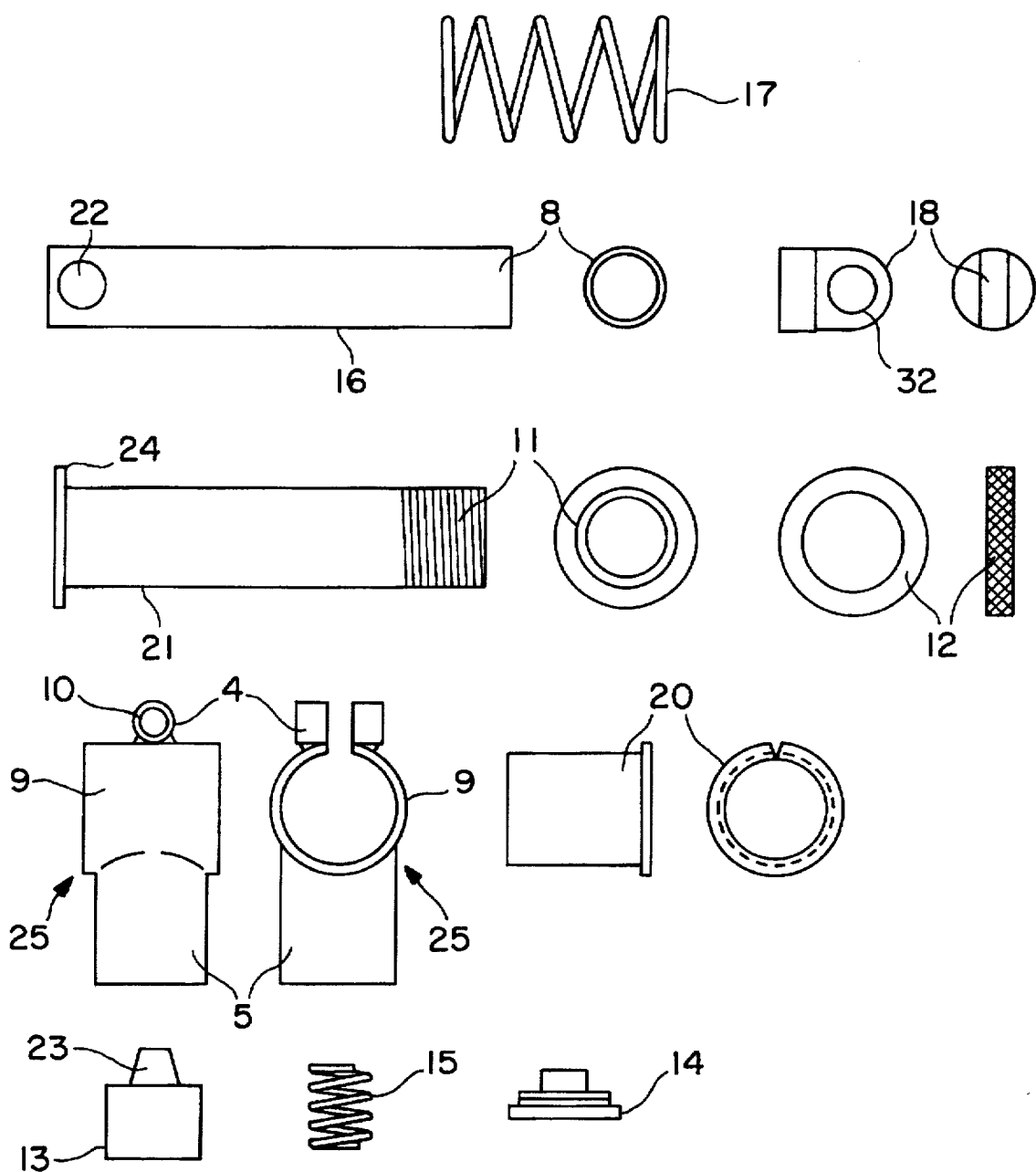
FIG. 3 is an exploded view of parts which together constitute a locking/cushioning means inside an embodiment of the handlebar stem in accordance with the invention.

In the embodiment shown in FIGS. 2 and 3 there is also included an option for adjusting damping in the shock cushioning action. Inside sleeve 9 there is a slide gasket 20, see FIG. 3, having an inside friction layer, i.e. the slide gasket is positioned between sleeve 9 and outer pipe 11. The sleeve 9 is split on top through its entire length (see FIG. 3), and on each side of the split are tightening members, i.e. a shoulder member 4 with a screw thread 10 for receiving a bolt or screw 27, preferably an umbraco screw. Tightening the screw 27 will increase the friction against the outer pipe 11 in the cushioning action, i.e. damping is increased. By tightening the screw completely, the cushioning operation can be eliminated totally.

The screw 27 is operated by means of a tool through a hole 28 (FIG. 1) in the upper profile arm 2. This must be done in a certain angular position of the handlebar stem, where hole 28 and screw 27 are aligned with each other.

As a starting point, the holes 16 are placed in such positions on the inner pipe 8 that a shock cushioning action is achieved for all locked angular positions. However, in certain embodiments it may be favorable to arrange the extreme angular positions (i.e. maximum deflection), or one of these extreme positions, without any resilient or cushioning action, i.e. completely stiff regarding shocks. Concerning the lower extreme position, it is possible quite simply to place the last hole 16 in a position corresponding to this angular position, and the geometry of the parts themselves will prevent further cushioning action downward. However, regarding prevention of downward cushioning from the upper extreme angular position, a special blocking means must be inserted.

Figure 4:
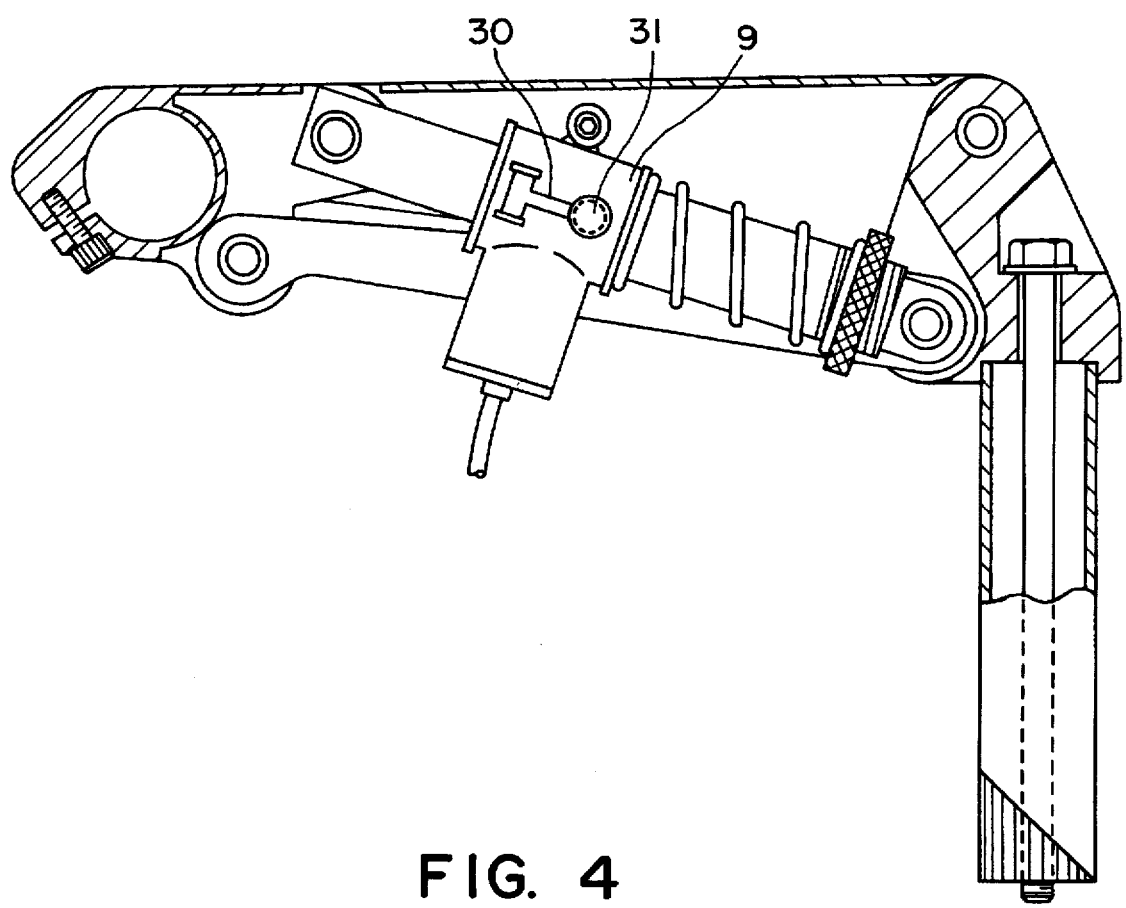
FIG. 4 is a sectional view of an embodiment where the cushioning function can be eliminated when desirable.

Moreover, it is possible to disconnect the cushioning and damping function also in such a manner as shown in FIG. 4. A lever or switch on the handlebars is then used, having a cable/wire connection to a pivot arm 30 mounted on sleeve 9. The pivot arm 30 has a conically shaped pin 31 which engages a hole in the outer pipe 11, and hence the damping function is disconnected. The pivot arm 30 can also be operated from the underside of the handlebar stem, i.e. in an embodiment without cable/wire connection.

In FIG. 4 also appears the per se conventional fixing of the post 7 to the frame tube, by means of a bolt and a wedge member. The bolt is placed in a somewhat deeper recess than in the normal case, from practical considerations.

In FIG. 3 is shown, as previously mentioned, most of the members constituting the locking/cushioning means provided inside the preferred embodiment of the handlebar stem in accordance with the invention, in a state of separation. Member 14 is a screw lid on the underside of the locking pipe socket 5. Screw lid 14 constitutes an abutment for spring 15, and it also operates as a shoulder for the cable sheath 19 from the operating lever on the handlebars. The cable wire ends in a ball resting inside the conical piston stud 23.

Member 18 is an eyebolt for providing fastening of the outer pipe 11 to the lower rear bearing D, with a hole 32 adapted to the bearing and a threaded fastening for the outer pipe 11. The eyebolt may be provided with a flange as an abutment for spring 17.

When the operating lever on the handlebar is released when piston 13 is near a position toward a hole 16, spring 16 will force the conical piston stud 23 into the hole with an easily perceptible sound when the corresponding position is reached. Such an acoustic signal is useful as a confirmation of locking.

In general the present invention utilizes the phenomenon that the distance between two diagonally placed bearings, for instance the upper forward (A) and the lower rear (D) bearings, change when a rotation about the bearings is undertaken. The difference between minimum and maximum diagonal distance will in the practical case be in the range 20–50 mm.

As for spring forces, the powerful spring 17 will in a state of complete compression provide a force of about 150–250 kp, while the tensioning spring 26 and the piston spring 15 are dimensioned with a much weaker force.

Other spring types than the helical springs 15 and 17 shown here can possibly be used, for example resilient pads or similar devices.

Further, it will be possible to place the locking/cushioning means between the two other bearings, that is bearings B and C, however then with reversal of certain functions.

Quite generally it is also possible to provide a stepless adjustment of the locked angular positions, for instance with a clamp means instead of the conical stud and holes, but a solution of the type described above in detail, is preferred due to the simple construction thereof.

However, the various possible variants within the scope of the invention, are those comprised by the appended patent claims, and particularly by patent claim 1.

I claim:

1. A handlebar stem for a bicycle, said handlebar stem comprising:

a post to be clamped to a bicycle tube frame;

upper and lower profile arms journalled to a top part of said post;

a forward handlebar clamp journalled to said upper and lower profile arms;

said handlebar clamp and said upper and lower profile arms being movable to different angular positions relative to said post;

a shock absorber acting to cushion forces acting on said handlebar clamp in at least some of said different angular positions, said shock absorber including an outer pipe, an inner pipe telescopically movable in said outer pipe, and a first spring having a spring force acting between said inner and outer pipes, said spring force tending to move said inner and outer pipes relative to each other in a first direction and cushioning relative movement between said inner and outer pipes in a second direction opposite to said first direction; and a locking device operable to lock said handlebar clamp and said upper and lower profile arms in a plurality of arrested different angular positions relative to said post, said locking device comprising a plurality of holes formed in said inner pipe and arranged in a row extending longitudinally thereof, a piston mounted outwardly of said outer pipe and having a stud, and a second spring urging said piston toward said inner pipe to cause said stud to enter a selected one of said holes in said inner pipe.

2. A handlebar stem as claimed in claim 1, wherein said holes are in an underside of said inner pipe.

3. A handlebar stem as claimed in claim 1, wherein said holes are conically tapered, and said stud is conical.

4. A handlebar stem as claimed in claim 1, further comprising a wire to move said piston against said second spring and to move said stud out of said one hole.

5. A handlebar stem as claimed in claim 1, wherein said plurality of holes includes a rearwardmost hole, and when said stud is positioned in said rearwardmost hole said handlebar clamp and said upper and lower profile arms are in a maximum downward said angular position and said first spring is in a position preventing cushioning thereby.

6. A handlebar stem as claimed in claim 1, further comprising a locking device for preventing movement between said inner and outer pipes when said handlebar clamp and said upper and lower profile arms are in a maximum upward said angular position.

7. A handlebar stem as claimed in claim 1, wherein said upper and lower profile arms are journalled to said top part of said post respectively at an upper rear bearing and at a lower rear bearing, and said handlebar clamp is journalled to said upper and lower profile arms respectively at an upper forward bearing and at a lower forward bearing.

8. A handlebar stem as claimed in claim 7, wherein said inner pipe is fastened to said upper forward bearing and said outer pipe is fastened to said lower rear bearing.

9. A handlebar stem as claimed in claim 8, wherein said first spring comprises a powerful helical spring positioned outwardly of and around said outer pipe, said first spring having a rear end abutting a member connected at said lower rear bearing and a front end abutting a rear end of a substantially cylindrical sleeve mounted slidably and concentrically about a forward end of said outer pipe, said outer pipe having at a forward edge thereof a flange limiting forward sliding movement of said sleeve.

10. A handlebar stem as claimed in claim 9, wherein said member comprises a toothed nut threaded onto threads on a rear end of said outer pipe, said toothed nut being adjustable on said threads to adjust said spring force of said first spring.

11. A handlebar stem as claimed in claim 9, wherein said member comprises a flange of an eyebolt fastened to said lower rear bearing.

12. A handlebar stem as claimed in claim 9, further comprising a return spring mounted on one of said bearings and having a spring force acting to provide resistance to movement of said handlebar clamp and said upper and lower profile arms to a lower said angular position and acting to provide assistance to movement of said handlebar clamp and said upper and lower profile arms to a higher said angular position.

13. A handlebar stem as claimed in claim 9, wherein said sleeve has therethrough a longitudinal split having on opposite sides thereof threaded shoulders to receive a threaded bolt to enable adjustment of tightening of said sleeve about said outer pipe and thereby adjustment of cushioning of said shock absorber.

14. A handlebar stem as claimed in claim 13, further comprising a layer of friction material between said sleeve and said outer pipe.

15. A handlebar stem as claimed in claim 13, wherein said upper profile arm has therethrough a hole to allow passage of a tool to adjust said threaded bolt.

16. A handlebar stem as claimed in claim 9, wherein said piston is movable within a locking pipe socket that is integral with said sleeve and that extends substantially transversely therefrom.

17. A handlebar stem as claimed in claim 16, wherein said locking pipe socket extends substantially perpendicularly downwardly from said sleeve.

18. A handlebar stem as claimed in claim 16, wherein said stud is urged by said second spring through an opening in said sleeve and through an elongated axial slot in said outer pipe into said selected one of said holes in said inner pipe.

19. A handlebar stem as claimed in claim 16, further comprising a wire connected to said piston and operable to move said piston against said second spring and to move said stud out of said selected one of said holes.

20. A handlebar stem as claimed in claim 19, further comprising a threaded lid closing an outer end of said locking pipe socket, said lid having therethrough a hole through which passes said wire.

* * * * *